(12) United States Patent
Timm

(10) Patent No.: US 11,100,337 B2
(45) Date of Patent: Aug. 24, 2021

(54) DETERMINING A STATE OF THE SURROUNDING AREA OF A VEHICLE, USING LINKED CLASSIFIERS

(71) Applicant: Robert Bosch GmbH, Stuttgart (DE)

(72) Inventor: Fabian Timm, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 97 days.

(21) Appl. No.: 16/387,292

(22) Filed: Apr. 17, 2019

(65) Prior Publication Data

US 2019/0347488 A1 Nov. 14, 2019

(30) Foreign Application Priority Data

May 9, 2018 (DE) .............................. 102018207194

(51) Int. Cl.
*G06K 9/00* (2006.01)
*G06K 9/62* (2006.01)

(52) U.S. Cl.
CPC ....... *G06K 9/00791* (2013.01); *G06K 9/6227* (2013.01); *G06K 9/6256* (2013.01); *G06K 9/6289* (2013.01)

(58) Field of Classification Search
None
See application file for complete search history.

(56) References Cited

U.S. PATENT DOCUMENTS

| 2018/0157934 A1* | 6/2018 | Hu ........................... G06N 3/08 |
| 2018/0174042 A1* | 6/2018 | Srinivasa ............... G06N 3/049 |
| 2019/0205700 A1* | 7/2019 | Gueguen .............. G06K 9/2054 |

* cited by examiner

*Primary Examiner* — Jianxun Yang
(74) *Attorney, Agent, or Firm* — Norton Rose Fulbright US LLP; Gerard Messina

(57) ABSTRACT

A method for determining a state of the surrounding area of a vehicle includes: receiving sensor data of at least one surrounding-area sensor of the vehicle; feeding at least a first portion of the sensor data into at least one first classifier; generating an intermediate probability from the first portion of the sensor data, using the first classifier; feeding at least a second portion of the sensor data and the at least one intermediate probability into a second classifier; generating a final probability of the state of the surrounding area from the second portion of the sensor data and the at least one intermediate probability, using the second classifier.

11 Claims, 3 Drawing Sheets

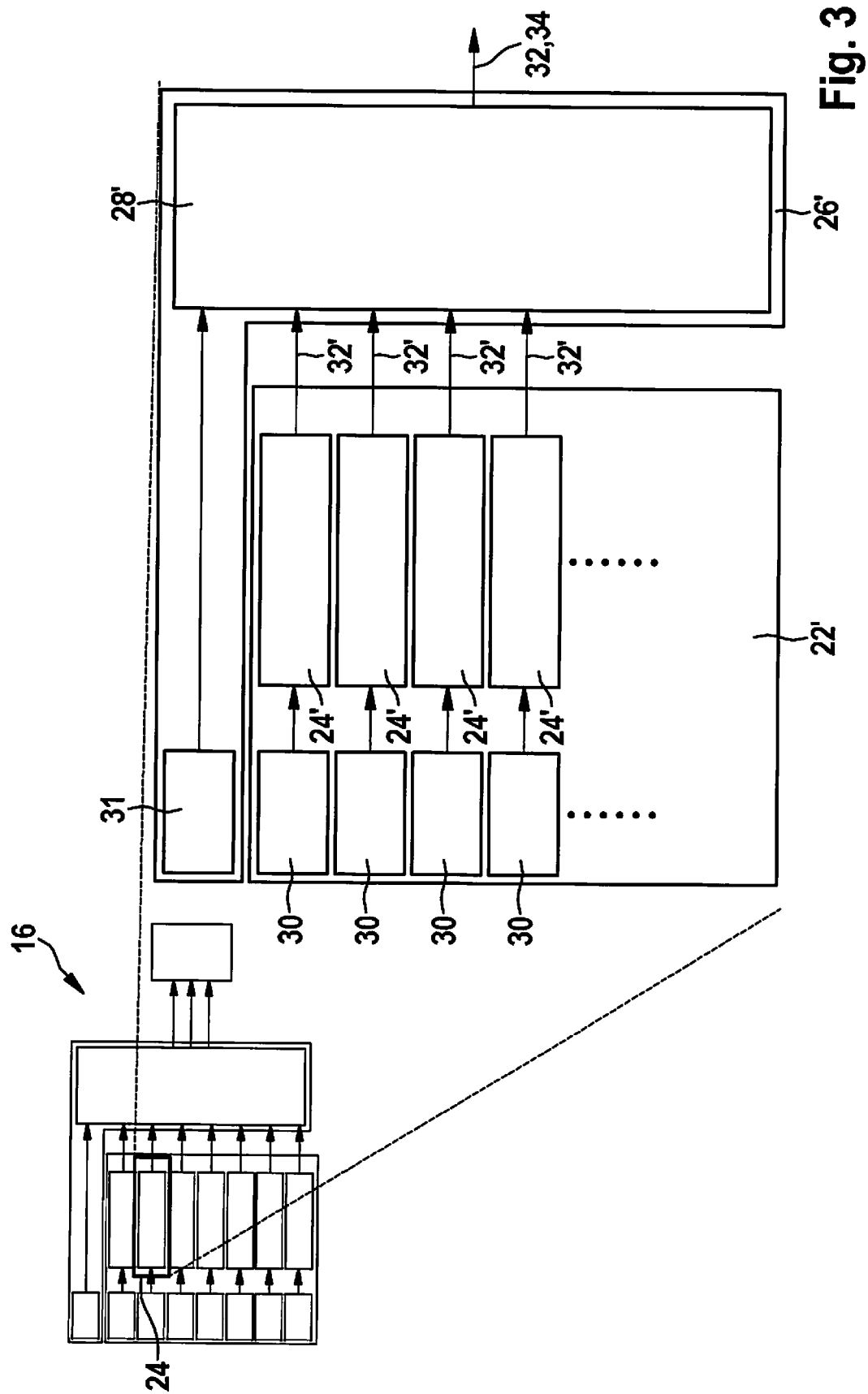

DETERMINING A STATE OF THE SURROUNDING AREA OF A VEHICLE, USING LINKED CLASSIFIERS

RELATED APPLICATION INFORMATION

The present application claims priority to and the benefit of German patent application no. 10 2018 207 194.2, which was filed in Germany on May 9, 2018, the disclosure which is incorporated herein by reference.

FIELD OF THE INVENTION

The present invention relates to a method and a system for determining a state of the surrounding area of a vehicle.

BACKGROUND INFORMATION

Driver assistance systems use sensor data from sensors installed in the vehicle, in order to monitor the surrounding area of the vehicle and acquire information from it for controlling the vehicle. To that end, driver assistance systems often use model-based methods, in order to allow good physical reproducibility and, consequently, simple evaluation from the point of view of safety. Driver assistance systems are becoming more and more complex and are making higher and higher demands on the available computing capacity. Therefore, attempts are being made to replace model-based methods with data-based and/or learning-based methods. An example of this would be the use of a method, which is based on a deep convolution neural network.

Although such deep learning methods sometimes achieve excellent results, it is, however, not always easy to ensure the intended function. In this context, the correct assessment of a situation, the correct vehicle performance, and the robustness of the function with respect to sensor noise or unknown objects must be validated and ensured.

A further challenge in connection with methods based on neural networks may be based on the fact that as a rule, the first input layer of a neural network may not obtain any invalid values. Unfortunately, in the case of characteristics, which are calculated from radar data, this condition is not always valid. For example, certain characteristics, such as the elevation, may not be calculated reliably for all object angles.

SUMMARY OF THE INVENTION

An object of the present invention is to improve the correctness of the output and the robustness of a system for determining a state of the surrounding area of a vehicle.

This object may be achieved by the subject matter of the descriptions herein. Further specific embodiments of the present invention are derived from the further and following descriptions.

One aspect of the present invention relates to a method for determining a state of the surrounding area of a vehicle. The method may be executed automatically by a system of the vehicle, which is, for example, part of a driver assistance system of the vehicle. For example, the system may execute a corresponding computer program. The vehicle may be a road vehicle, such as a passenger car, cargo truck, motorcycle or bus. The vehicle may be a rail vehicle, such as a streetcar.

The state of the surrounding area of the motor vehicle may describe the presence of objects in the surrounding area, such as other vehicles, obstacles, the road, etc., and/or situations, such as collision danger. In one case, the state of the surrounding area may describe a situation, such as an "obstacle," and determine this, using one or more probabilities. The state of the surrounding area may be indicated by the presence and/or absence of an object class.

According to one specific embodiment of the present invention, the method includes: receiving sensor data of at least one surround sensor of the vehicle; feeding at least a first portion of the sensor data into at least one first classifier; generating an intermediate probability from the first portion of the sensor data, using the first classifier; feeding at least a second portion of the sensor data and the at least one intermediate probability into a second classifier; and generating a final probability of the state of the surrounding area from the second portion of the sensor data and the at least one intermediate probability, using the second classifier.

In summary, the method may be executed by two blocks; the first block including one or more first classifiers, and the second block including a second classifier. In each instance, at least a portion of the sensor data is fed into the two blocks. From these, the two blocks calculate at least one probability per classifier. In this context, the outputs, that is, the probabilities, from the first block are additionally used as an input for the second block. This may increase the correctness and the robustness of the overall method.

In this case, a classifier may be a module and/or a software component, which calculates one or more probabilities of a state of the surrounding area and/or an object class on the basis of input values, such as the relevant portion of the sensor data.

The first classifier(s) from the first block may be, in this instance, specific classifiers, which determine more specific states of the surrounding area than the second classifier. Thus, the second classifier from the second block may be regarded as a more general classifier. The probabilities generated by the classifiers from the first block may be referred to as intermediate probabilities or specific probabilities. The probabilities generated by the classifier from the second block may be referred to as final probabilities or general probabilities.

For example, the first block may include a plurality of classifiers, which generate an intermediate probability of the presence of a "truck," "car," "motorcycle," "pedestrian," etc. in front of the vehicle. However, the second classifier may output the probability of an "obstacle" in front of the vehicle as a final probability. In this connection, it should be noted that the method may also be used for classifying other situations or other safety-related tasks of a driver assistance system.

Using this procedure, that is, the inputting of the probabilities from the first block into the second block in addition to the sensor data, the robustness of the method may be increased, since the more specific result(s) from the first block must be consistent with the input of the sensor data into the second block.

In addition, the first block and the second block may be implemented on different processors, which may increase the redundancy and/or fault tolerance. Furthermore, the intermediate probabilities from the first block may be used as inputs for other functions. The classifiers from the first block may be used redundantly in other functions.

The surrounding-area sensor may be, for example, a radar system, a laser system, an ultrasonic system and/or a camera. Therefore, the sensor data may include radar data and/or lidar data and/or ultrasonic data.

According to one specific embodiment of the present invention, the method further includes: feeding at least a portion of the sensor data into a plurality of first classifiers; generating an intermediate probability from the second portion of the sensor data, using each of the first classifiers; and feeding the intermediate probabilities into the second classifier. As already mentioned, the first block may include more than one classifier. The classifiers from the first block may classify specific states of the surrounding area, which each include information about the general state of the surrounding area, which is classified by the classifier from the second block.

According to one specific embodiment of the present invention, the first classifier and the second classifier determine the corresponding probability, using different classification methods. A plurality of first classifiers may also be based on different classification methods. On the whole, the classifiers may be different, both between the blocks and within the blocks. In this context, a classification method may be understood as the algorithm, by which the input data or the sensor data are evaluated.

In this case, two classifiers may have been trained, using different training data, i.e., may have been provided with different model data, but operate by the same algorithm. In this case, the classifiers operate, using the same classification method.

According to one specific embodiment of the present invention, the first classifier and/or the second classifier are based on a learning-based classification method, which has been automatically trained, using training data already classified. Learning-based classification methods may include, for example, methods based on neural networks or based on statistical evaluations. A deep-learning method would be an example of this.

According to one specific embodiment of the present invention, the first classifier and/or the second classifier are based on a model-based classification method, which includes a model that has been modeled on the basis of training data already classified. In a model-based method, the model may have been modeled manually, that is, by a person.

For example, the first classifier(s) (or some of these first classifiers) from the first block may be based on a model-based method. The second classifier from the second block may be based on a learning-based method. However, it is also possible for both the first classifier(s) and the second classifier to be based on the same method, such as a learning-based method, for example, a deep-learning method.

According to one specific embodiment of the present invention, the method further includes: determining a first feature vector from the sensor data for the first classifier; the first classifier determining the intermediate probability from the first feature vector. In each instance, a feature vector may also be determined for a plurality of classifiers from the first block. The feature vector may be viewed as sensor data compressed in a special manner. Consequently, the method of the classifier does not have to be executed on all of the sensor data, but only on the feature vector, which may be considerably shorter or longer than the sensor data for the classifier.

According to one specific embodiment of the present invention, the method further includes: determining a second feature vector from the sensor data for the second classifier; the second classifier determining the final probability from the second feature vector. The sensor data of the second classifier may also be compressed in this manner.

For example, each classifier (a first and/or a second classifier) may include an input module, which generates the feature vector from the relevant portion of the sensor data.

According to one specific embodiment of the present invention, the first feature vector and the second feature vector are different. It is possible for a feature vector for a first classifier to be generated differently and/or from other sensor data than that for the second classifier. The use of different feature vectors may increase the robustness and/or the performance of the method.

According to one specific embodiment of the present invention, feature vectors are generated from the sensor data for a plurality of respective, first classifiers. In this context, the feature vectors for a plurality of first classifiers may be different. For example, a classifier for "pedestrians" may obtain a feature vector, which additionally contains information about the micro-Doppler characteristics of radar data (as a rule, pedestrians exhibit a high degree of micro-Doppler echoes, which is caused by movements of the limbs). A classifier for a vehicle, such as "passenger car," "cargo truck," etc., may obtain a feature vector, which does not contain these micro-Doppler characteristics. In the case of vehicles, these characteristics are less pronounced and less relevant, and therefore, the classification may take place without them.

According to one specific embodiment of the present invention, the first portion of the sensor data used by the at least one first classifier differs from the second portion of the sensor data, which is used by the second classifier. In addition, the robustness of the method may be increased by making particular sensor data available to only one of the blocks.

According to one specific embodiment of the present invention, the first portion and the second portion are portions of the sensor data independent of each other. The sensor data may be split up, and the sensor data, which are provided to the first block or the first classifiers, may not be inputted into the second classifier, and vice versa. In other words, the first portion of the sensor data and the second portion of the sensor data may be independent data sources. For example, the first portion of the sensor data may come from a first sensor, and the second portion of the sensor data may come from a second sensor.

Furthermore, if the first or some of the first classifiers and the second classifier are based on learning-based methods, it is possible for the learning-based methods to be trained on independent data. This may improve the correctness of the method.

According to one specific embodiment of the present invention, the first classifier and/or the second classifier are each made up of at least one first subclassifier and a second subclassifier; a probability generated by the at least one first subclassifier being fed into the second subclassifier. In other words, like the system, one or more of the classifiers may be made up of the one or more first classifiers and the second classifier, that is, include a first block and a second block; the outputs of the first block being fed into the second block. A subclassifier may be a classifier, which is part of a superordinate classifier.

According to one specific embodiment of the present invention, the at least one first classifier generates more than one intermediate probability. For example, a first classifier may output a probability of the presence of the state of the surrounding area to be classified, and a probability of the absence of the state of a surrounding area to be classified.

According to one specific embodiment of the present invention, the second classifier generates a first final probability that the state of the surrounding area is present. In general, probabilities may be indicated by a value between 0 and 1.

According to one specific embodiment of the present invention, the second classifier generates a second final probability that the state of the surrounding area is not present. In general, the second classifier may generate one, two, three or more final probabilities as output signals.

According to one specific embodiment of the present invention, the second classifier generates a third final probability that the sensor data may be classified. It is possible for the third final probability to be generated and/or outputted together with the first final probability and/or the second final probability.

The generation and/or the output of the third final probability is rendered possible, in particular, by additionally inputting the intermediate probabilities from the first block into the second classifier.

For example, in addition to the classes "obstacle" and "non-obstacle," a second classifier for obstacles may also output the class "unknown" and/or probabilities of these classes as a state of the surrounding area.

The robustness is increased by the third final probability, since the calculated features may differ sharply from the training data in response to sharp changes in the sensor data. The same may apply to objects and/or situations, which were not included in the training.

According to one specific embodiment of the present invention, the method further includes: outputting the final probability to a control system of the vehicle, and controlling the vehicle on the basis of the final probability. For example, the vehicle may begin to brake autonomously, if an obstacle has been detected in front of the vehicle.

A further aspect of the present invention relates to a system for determining a state of the surrounding area of a vehicle. The system may execute the method, as described above and in the following.

The system includes at least one first classifier for receiving at least one first portion of sensor data of the vehicle and for generating an intermediate probability from the received sensor data, and at least one second classifier for receiving at least a second portion of sensor data of the vehicle and for generating a final probability regarding the state of the surrounding area from the received sensor data and the at least one intermediate probability.

In addition, the system may include one or more sensors, which generate the sensor data. The system may also include a control system, into which the final probability(ies) are inputted, and which controls the vehicle on the basis of this or these probabilities.

It is understood that features of the method, as described above and in the following, may also be features of the system, and vice versa.

In the following, exemplary embodiments of the present invention are described in detail with reference to the attached figures.

Identical or similar parts are always denoted by the same reference numerals.

BRIEF DESCRIPTION OF THE DRAWINGS

FIG. 3 schematically shows a detail from a classification system according to a specific embodiment of the present invention.

DETAILED DESCRIPTION

Figure 1:
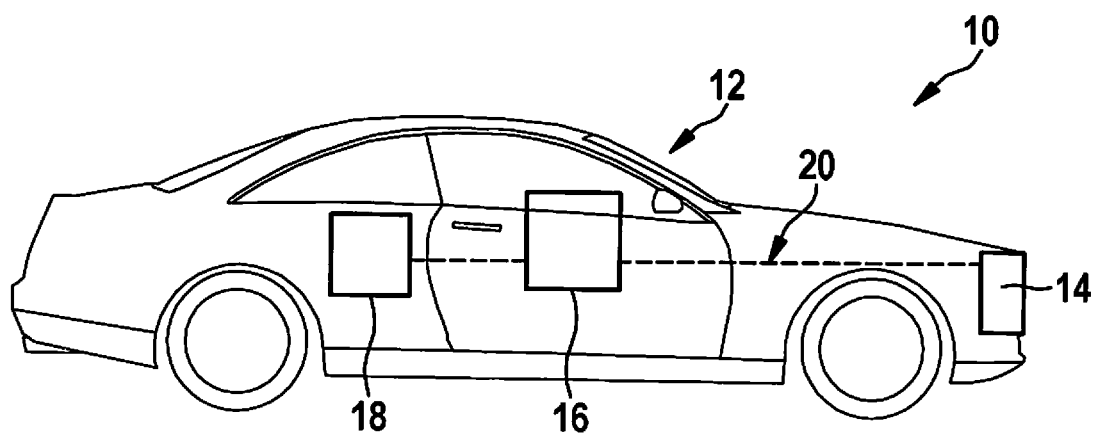
FIG. 1 schematically shows a vehicle having a classification system according to a specific embodiment of the present invention.

FIG. 1 shows a vehicle 10 having a system 12, which includes one or more sensors 14, a driver assistance system 16 and a brake system 18. Sensor(s) 14 may include a radar sensor and/or a camera and/or a lidar sensor and/or an ultrasonic sensor. Driver assistance system 16 obtains sensor data 20 from sensor(s) 14, evaluates them, and automatically initiates deceleration with the aid of brake system 18, if sensor data 20 indicate, for example, an obstacle in front of vehicle 10.

Figure 2:
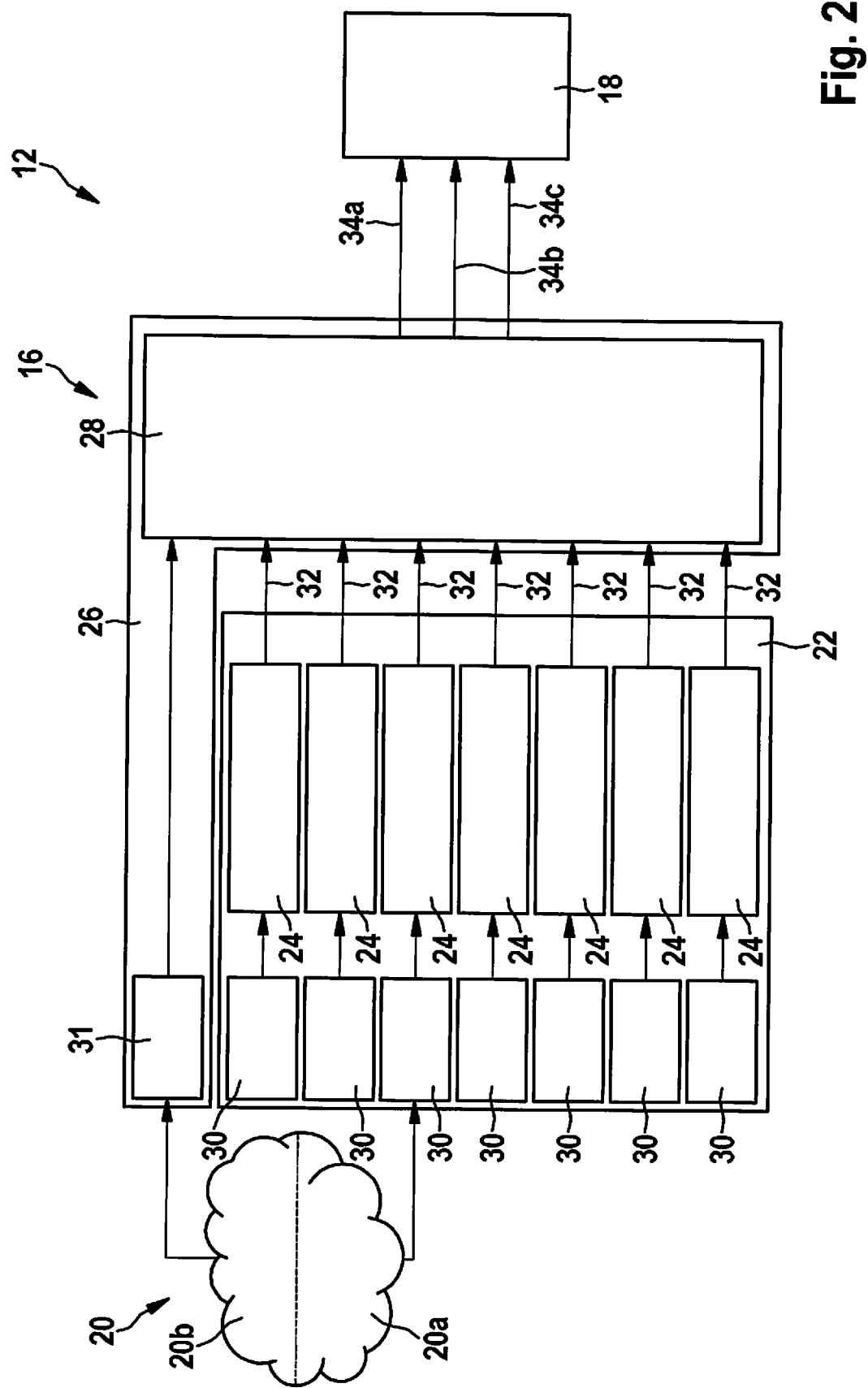
FIG. 2 schematically shows a classification system according to a specific embodiment of the present invention.

FIG. 2 shows, in more detail, system 12 and, in particular, the components of driver assistance system 16 relevant to the method described here.

System 16 includes a first block 22 having a plurality of first classifiers 24, and a second block 26 having a second classifier 28. It is possible for block 22 to include only one first classifier 24, and for second block 26 to include a plurality of second classifiers 28. Classifiers 24, 28 may be based on learning-based and/or model-based methods, as described further above.

A first portion 20a of sensor data 20 is fed into first block 22. A second portion 20b of sensor data 20 is fed into second block 26. Portions 20a, 20b of sensor data 20 may differ from each other at least partially. It is also possible for portions 20a, 20b to be independent of each other, that is, to not overlap. For example, portions 20a and 20b may come from different sensors 4. For increased robustness and consistent classification results, the classifiers from first block 22 and the classifiers 28 from second block 26 may also be trained on partially independent or completely independent data.

For each of classifiers 24, 28, feature vectors 30, 31 are calculated from respective portions 20a, 20b of sensor data 20. This may be accomplished by respective classifiers 24, 28 or by a separate module, which, for example, may also generate a feature vector 30, 31 for a plurality of classifiers 24, 28. A feature vector 30, 31 may encode object characteristics, which may be derived from sensor data 20.

Feature vectors 30, 31 of different classifiers 24, 28 may be different. For example, feature vector 31 for classifiers 28 may be different from feature vector 30 of a classifier 24. It is also possible for two feature vectors 30 for two or more classifiers 24 to be different. For example, the micro-Doppler characteristics may be relevant, in particular, to a radar-based classification of pedestrians or cyclists. However, these characteristics may be more likely to be disturbing or irrelevant to the classification of passenger cars. Therefore, one feature vector 30 for a classifier 24 may include micro-Doppler characteristics, and another may not.

One or more intermediate probabilities 32 are calculated by each of classifiers 24 from feature vectors 30. Each of intermediate probabilities 32 may be a value between 0 and 1.

As shown here, block 22 may include a plurality of classifiers 24, which each carry out an individual classification for a particular object type and/or a particular situation. For example, one of the classifiers 24 may put the data from corresponding feature vector 30 into the classes "passenger car" or "not a passenger car." Additional examples of such classifiers 24 are listed in the table further down.

Probabilities 32 and feature vector 31 of second block 26 are fed into classifier 28. Classifier 28 may classify one or more upper classes for the individual classification of classifiers 24. Classifier 28 may calculate three final probabilities 34a, 34b, 34c, which indicate the presence of a first upper class and a second upper class, and the absence of the two upper classes, respectively.

For example, classifier 28 may classify obstacles and non-obstacles and final probabilities 34a, 34b, 34c for the classes "obstacle," "non-obstacle," and "unknown."

The following table shows examples of classifiers 28 and of possible intermediate probabilities 32 and final probabilities 34a, 34b, 34c.

|  | Ex. 1 | Ex. 2 | Ex. 3 |
|---|---|---|---|
| Classifier 24 |  |  |  |
| For a cargo truck | 0.4 | 0.10 | 0.80 |
| For a passenger car | 0.9 | 0.25 | 0.70 |
| For a motorcycle | 0.2 | 0.01 | 0.90 |
| For a pedestrian | 0.1 | 0.15 | 0.60 |
| For a cyclist | 0.15 | 0.25 | 0.50 |
| For an object capable of being run over | 0.2 | 0.10 | 0.80 |
| For an object capable of being driven under | 0.01 | 0.05 | 0.90 |
| Classifier 28 |  |  |  |
| Obstacle | 0.85 | 0.20 | 0.15 |
| Non-obstacle | 0.12 | 0.10 | 0.05 |
| Unknown | 0.03 | 0.75 | 0.80 |

Example 1 is an example classification of a passenger car. In this instance, passenger-car classifier 24 supplies a high probability 32, and the other individual classifiers 24 from first block 22 each supply low probabilities 32. On the basis of this pre-classification and feature vector 30 for second block 26, obstacle classifier 28 calculates a high probability 34a of an obstacle. Autonomous activation of brake system 18 may be permitted and may also take place.

Analogously, in the case of a van, the two individual classifiers 24 for a passenger car and a cargo truck may each have high probabilities 32, and the other individual classifiers 24 may each have low probabilities 32. On the basis of these two high individual values and the use of its feature vector 30, obstacle classifier 28 may calculate a high final probability 34a. Consequently, this may still result in activation of braking system 18, although the exact object type has not been uniquely classified.

Example 2 from the table is an example classification of an object of a hitherto unknown class, for example, of a class, which was not included in the training data. Individual classifiers 24 each deliver low probabilities 32, and obstacle classifier 28 calculates a high final probability 34c of the class "unknown."

Example 3 from the table is an example of the result of the classification in the case of an unknown sensor malfunction. In this case, the majority of individual classifiers 24 supply a high probability 32, and here, obstacle classifier 28 also calculates a high final probability 34c of the class "unknown."

FIG. 3 shows that the splitting-up of a classification system 16 into two blocks 22, 28 may also be cascaded, in order to allow an even more specific and more robust classification. One, some or all of first classifiers 24 and/or second classifier 28 may each be made up of a first block 22' and a second block 26'. In this context, the first block includes at least one subclassifier 24', which calculates an intermediate probability 32' that is fed into a second subclassifier 28'. In a manner analogous to FIG. 2, a feature vector 30, 31 may be fed into each of first subclassifiers 24' and into second subclassifier 28'. Second subclassifier 28' calculates the probability 32, 34 of the higher level from feature vector 31 and intermediate probability 32'.

In addition, it should be pointed out that "including" does not exclude any other elements or steps, and "a" or "one" does not exclude a plurality. In addition, it is emphasized that features or steps, which have been described with reference to one of the exemplary embodiments above, may also be used in combination with other features or steps of other exemplary embodiments described above. Reference numerals in the claims are not to be regarded as a limitation.

What is claimed is:

1. A method comprising:
   receiving sensor data of at least one surrounding-area sensor of a vehicle, the sensor sensing a surrounding area of the vehicle;
   feeding at least a first portion of the sensor data into at least one first classifier;
   using the at least one first classifier, generating, from the at least the first portion of the sensor data, an intermediate probability regarding an object in the surrounding area of the vehicle, the intermediate probability including a first probability that the object is classified as being a specific predefined object;
   feeding into a second classifier at least a second portion of the sensor data and the intermediate probability, wherein the at least the portion of the second data that is fed into the at least one first classifier and the at least the second portion of the sensor data that is fed into the second classifier are different than each other so that at least some data fed into the at least one first classifier is not fed into the second classifier and vice versa; and
   using the second classifier, generating, from (a) the second portion of the sensor data and (b) the first intermediate probability that the object is classified as being the specific predefined object, a final probability regarding the object, the final probability including a probability that the object is classified as an obstacle.

2. The method of claim 1, wherein:
   the at least one first classifier includes a plurality of first classifiers into which the at least the portion of the sensor data is fed;
   the intermediate probability includes additional intermediate probabilities generated using respective ones of the plurality of first classifiers; and
   the additional intermediate probabilities are also fed into the second classifier for generating the final probability.

3. The method of claim 1, wherein:
   the first classifier and the second classifier determine the corresponding probability, using different classification methods;
   the first classifier and/or the second classifier are based on a learning-based classification method, which has been trained, using training data already classified; and/or
   the first classifier and/or the second classifier are based on a model-based classification method, which includes a model that has been modeled based on the training data already classified.

4. The method of claim 1, further comprising:
   determining a first feature vector from the sensor data for the first classifier, wherein the first classifier determines the intermediate probability from the first feature vector; and determining a second feature vector from the sensor data for the second classifier, wherein the second classifier determines the final probability from the second feature vector.

5. The method of claim 4, wherein the first feature vector and the second feature vector are different, and/or in each instance, feature vectors are generated from the sensor data for a plurality of first classifiers, and/or feature vectors for a plurality of first classifiers are different.

6. The method of claim 1, wherein the first portion of the sensor data used by the at least one first classifier and the second portion of the sensor data used by the second classifier independent from each other so that they do not overlap.

7. The method of claim 1, wherein the first classifier and/or the second classifier are each made up of at least one first subclassifier and one second subclassifier, and wherein a probability generated by the at least one first subclassifier is fed into the second subclassifier.

8. The method of claim 1, wherein the intermediate probability generated using the at least one first classifier includes more than one probability, and/or the final probability generated using the second classifier includes the final probability that the object is classified as the obstacle, a second final probability that there is no obstacle in the surrounding area of the vehicle, and a third final probability that the sensor data are classifiable.

9. The method of claim 1, further comprising:
outputting the final probability to a control system of the vehicle; and
controlling the vehicle based on the final probability.

10. The method of claim 1, wherein the intermediate probability includes one or more additional probabilities, each of the one or more additional probability being a respective probability that the object is classified as belonging to a respective other predefined object classification, and the final probability is generated based on a combination of the first probability and the one or more additional probabilities.

11. A system comprising:
at least one first classifier for receiving at least a first portion of sensor data of at least one surrounding-area sensor of a vehicle that senses a surrounding area of the vehicle, and for generating, from the at least the first portion of the sensor data, an intermediate probability regarding an object in the surrounding area of the vehicle, the intermediate probability including a first probability that the object is classified as being a specific predefined object; and
at least one second classifier for:
receiving at least a second portion of the sensor data and the intermediate probability, wherein the at least the portion of the second data that is received by the at least one first classifier and the at least the second portion of the sensor data that is received by the second classifier are different than each other so that at least some data fed into the at least one first classifier is not fed into the second classifier and vice versa; and
generating, from (a) the second portion of the sensor data and (b) the first intermediate probability that the object is classified as being the specific predefined object, a final probability regarding the object, the final probability including a probability that the object is classified as an obstacle.

\* \* \* \* \*